W. A. LEYER.
EGG TESTER.
APPLICATION FILED JAN. 22, 1917.

1,247,426.

Patented Nov. 20, 1917.

William A. Leyer
Inventor

By Geo. P. Kimmel
Attorney

UNITED STATES PATENT OFFICE.

WILLIAM A. LEYER, OF KNOXVILLE, TENNESSEE.

EGG-TESTER.

1,247,426. Specification of Letters Patent. Patented Nov. 20, 1917.

Application filed January 22, 1917. Serial No. 143,631.

*To all whom it may concern:*

Be it known that I, WILLIAM A. LEYER, a citizen of the United States, and resident of Knoxville, in the county of Knox and State of Tennessee, have invented certain new and useful Improvements in Egg-Testers, of which the following is a specification.

This invention relates to testing devices, and has more especial reference to a novel egg tester.

The invention has for its principal object to provide an egg tester with which the fitness of eggs for food may be positively ascertained by the user, thus, obviating the disagreeableness as attached to the breaking of stale or spoiled eggs under all circumstances.

It is a more specific object of the invention to provide an egg tester having means, whereby, the warmth of animal life, if any, of the egg will be indicated.

The improvements in the details and arrangements of the several parts will be apparent from an inspection of the accompanying drawings in connection with the specific description hereinafter contained, and wherein the preferred embodiment of the invention is disclosed for the purpose of imparting a full understanding of the same.

In the drawings.

Similar characters of reference are employed in all of the above described views to indicate corresponding parts.

Figure 1:
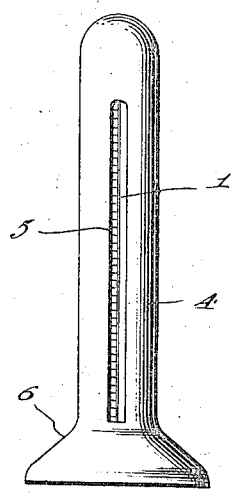
Figure 1 is a side elevation of the improved egg tester.
Figure 2:
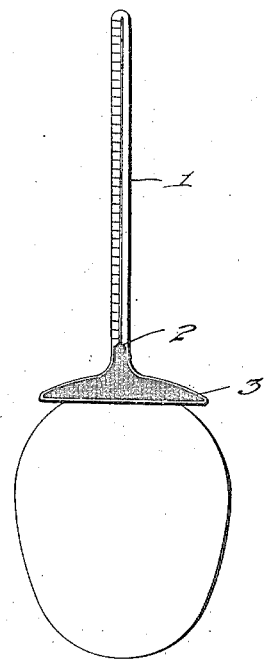
Fig. 2 is a side elevation in detail of the indicating means showing the proper positioning of the same with relation to an egg.
Figure 3:
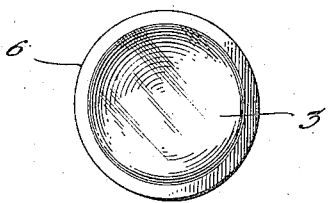
Fig. 3 is a bottom plan of the assembled tester.

Referring now more specifically to the drawings, there is provided an elongated tubular container 1, the said container being provided with, at its lower extremity a relatively enlarged cavity or reservoir 2, which reservoir is adapted to receive a suitable quantity of liquid mercury, which, as will be appreciated, is extremely sensitive and responds instantly to any variation of temperature, it of course being understood, that the reservoir communicates with the longitudinal opening in the container 1. An annular concaved shield 3, preferably formed of extremely thin glass is arranged over the bottom of the container 1 and will permit the existing difference in temperature to penetrate immediately to the liquid mercury within the container 1, thus, producing an immediate result. Suitable graduations may be and preferably are arranged upon the side of the container 1, whereby, to register the prevailing atmospheric temperature. Furthermore, it is to be understood, that the length of the tubular container may be varied, according to the volume of liquid mercury as contained within the cavity or reservoir 2.

With a view toward providing means for protecting the tubular container 1 which is preferably formed of glass, a hollow cylindrical casing 4 is provided and has formed in one side thereof an elongated longitudinally disposed slot 5, which slot is of a length to fully display the various graduations as arranged upon the said container. The lower extremity of the casing 4 is enlarged as at 6, thus, providing an efficient covering for the shield member 3 as arranged or formed upon the lower extremity of the tubular container 1. By so arranging the casing 4 about the tubular container, it is evident, that breaking of the same is materially lessened, further, that the mercury containing cavity or reservoir, by being arranged in spaced relation therefrom will not be subjected to other than the desired temperature, that is, handling of the tester when applying the same to an egg will not affect the efficiency of the same. The cap 6 by overlying the concave shield 3 will materially lessen the liability of breakage thereof and it is to be noted, that the said cap extends for a distance below the marginal edges of the said shield, thereby, providing an efficient stand for the tester. The casing 4 together with its cap 6 may be formed of any suitable material, such as wood, metal or the like, such as conditions or preference may dictate.

When the device is not being used as a means for testing eggs, it is to be understood that it will serve as the ordinary thermometer for registering atmospheric temperature.

Obviously, the construction may be modified in certain particulars and such modifications as are within the scope of my claim I consider within the spirit of my invention.

I claim:

In an egg tester, the combination of a transparent container having a hollow enlarged semi-spherical lower extremity forming a shield, having a reservoir therein for receiving a quantity of fluid mercury whereby to render the same responsive to warmth, said container having a plurality of graduations formed thereon, and a casing for said container and shield, said casing having a longitudinally extending slot therein to display the various graduations arranged upon said container, and the lower extremity of the casing being enlarged to provide a cover for the shield member for a purpose specified.

In testimony whereof, I affix my signature hereto.

WILLIAM A. LEYER.

Copies of this patent may be obtained for five cents each, by addressing the "Commissioner of Patents, Washington, D. C."